United States Patent
Bottari et al.

(10) Patent No.: US 10,009,095 B2
(45) Date of Patent: Jun. 26, 2018

(54) PROTECTION SWITCHING ACROSS INTERCONNECTING NODE

(71) Applicant: Telefonaktiebolaget LM Ericsson (publ), Stockholm (SE)

(72) Inventors: Giulio Bottari, Pisa (IT); Luca Giorgi, Pisa (IT); Peter Öhlén, Stockholm (SE); Björn Skubic, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/127,867

(22) PCT Filed: Mar. 24, 2014

(86) PCT No.: PCT/EP2014/055811
§ 371 (c)(1),
(2) Date: Sep. 21, 2016

(87) PCT Pub. No.: WO2015/144195
PCT Pub. Date: Oct. 1, 2015

(65) Prior Publication Data
US 2017/0117957 A1    Apr. 27, 2017

(51) Int. Cl.
*H04J 14/00*    (2006.01)
*H04J 14/02*    (2006.01)
(Continued)

(52) U.S. Cl.
CPC ........ *H04B 10/032* (2013.01); *H04J 14/0212* (2013.01); *H04J 14/0295* (2013.01);
(Continued)

(58) Field of Classification Search
CPC .............. H04B 10/032; H04J 14/0212; H04J 14/0295; H04J 41/0668; H04Q 11/0066; H04Q 2011/0016; H04Q 2011/0081
(Continued)

(56) References Cited

U.S. PATENT DOCUMENTS 6,385,165 B1    5/2002  Kumata
7,181,142 B1 *  2/2007  Xu ........................... H04J 3/14
                                              398/58
(Continued)

FOREIGN PATENT DOCUMENTS

EP    0 977 394 A2    2/2000
EP    2 493 096 A1    8/2012
WO    WO 2015003746    1/2015

OTHER PUBLICATIONS

White Paper: A Performance Comparison of WSS Switch Engine Technologies; JDS Uniphase Corporation—May 2009.
(Continued)

*Primary Examiner* — Oommen Jacob
(74) *Attorney, Agent, or Firm* — Baker Botts, LLP

(57) ABSTRACT

An optical communications network has an interconnecting node (100) coupled in between at least one hub node (130) and at least first (140) and second (150) access nodes, to provide working and protection optical paths. The interconnecting node has a working wavelength selective switch (110) to select which working wavelengths are coupled. A corresponding protection wavelength selective switch (120) is also provided for the protection wavelengths. In the event of detection of a fault, protection switching (230) is carried out at the access node and the hub node without altering the selections made by the wavelength selective switches in the interconnecting node. Thus protection schemes across the interconnecting node for more than one access node can be handled. By not needing to alter wavelength selections at the interconnecting node during protection switching operation, the complexity and thus costs can be reduced.

19 Claims, 15 Drawing Sheets

(51) Int. Cl.
   *H04B 10/032*   (2013.01)
   *H04L 12/707*   (2013.01)
   *H04Q 11/00*    (2006.01)
   *H04L 12/24*    (2006.01)

(52) U.S. Cl.
   CPC .......... *H04L 41/0668* (2013.01); *H04L 45/22* (2013.01); *H04Q 11/0066* (2013.01); *H04Q 2011/0016* (2013.01); *H04Q 2011/0081* (2013.01)

(58) Field of Classification Search
   USPC .......................................................... 398/5, 1
   See application file for complete search history.

(56) References Cited

U.S. PATENT DOCUMENTS

| | | | | |
|---|---|---|---|---|
| 9,319,758 | B2* | 4/2016 | Goswami | H04Q 11/0067 |
| 2006/0104638 | A1* | 5/2006 | Chung | H04J 14/0226 |
| | | | | 398/71 |
| 2006/0140625 | A1* | 6/2006 | Ooi | H04B 10/032 |
| | | | | 398/19 |
| 2006/0153567 | A1* | 7/2006 | Kim | H04J 14/02 |
| | | | | 398/72 |
| 2008/0124075 | A1* | 5/2008 | Xu | H04J 3/0682 |
| | | | | 398/25 |
| 2010/0098407 | A1* | 4/2010 | Goswami | H04B 10/032 |
| | | | | 398/5 |
| 2010/0189442 | A1 | 7/2010 | Grobe | |
| 2010/0260499 | A1* | 10/2010 | Izumi | H04J 14/02 |
| | | | | 398/48 |
| 2011/0158638 | A1* | 6/2011 | Mie | H04L 12/413 |
| | | | | 398/16 |
| 2012/0237213 | A1* | 9/2012 | Yin | H04B 10/071 |
| | | | | 398/28 |
| 2012/0237218 | A1* | 9/2012 | Yang | G02B 6/356 |
| | | | | 398/48 |
| 2013/0243416 | A1 | 9/2013 | Dahlfort et al. | |
| 2014/0355977 | A1* | 12/2014 | Bjornstad | H04Q 11/0062 |
| | | | | 398/25 |
| 2015/0215033 | A1* | 7/2015 | Lin | H04B 10/27 |
| | | | | 398/2 |
| 2015/0244494 | A1* | 8/2015 | Grobe | H04J 14/0278 |
| | | | | 398/68 |
| 2015/0288444 | A1* | 10/2015 | Pu | H04L 41/0663 |
| | | | | 398/5 |
| 2016/0329984 | A1* | 11/2016 | Rafel Porti | H04J 14/0246 |
| 2017/0117957 | A1* | 4/2017 | Bottari | H04B 10/032 |

OTHER PUBLICATIONS

A Single-Fiber Self-Healing CWDM Metro Access Ring Network for Broadcast and Dedicated Broadband Services by Zhaoxin Wang et al.; Department of Information Engineering, The Chinese University of Hong Kong, Shatin, N.T., Hong Kong—Jan. 1, 2013.
International Search Report for International application No. PCT/EP2014/055811—dated Dec. 9, 2014.

* cited by examiner

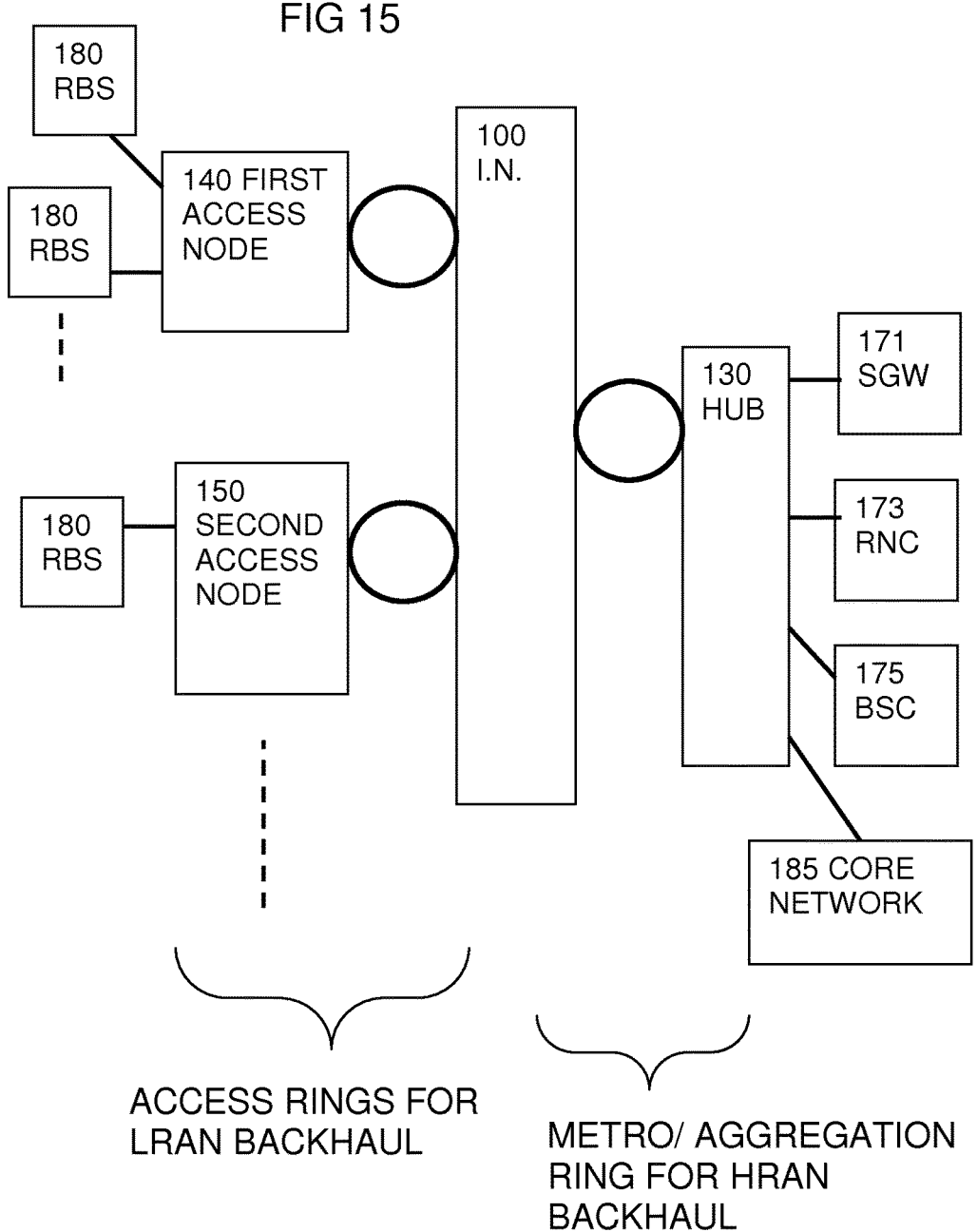

PROTECTION SWITCHING ACROSS INTERCONNECTING NODE

PRIORITY

This nonprovisional application is a U.S. National Stage Filing under 35 U.S.C. § 371 of International Patent Application Serial No. PCT/EP2014/055811, filed Mar. 24, 2014, and entitled "Protection Switching Across Interconnecting Node."

FIELD

The present invention relates to methods of using an optical communications network, to optical networks, and to interconnecting nodes for such networks.

BACKGROUND

It is known to provide WDM optical communications networks in the form of rings or interconnected rings. Typically these are bidirectional rings using two or four fibers. Various automatic protection switching schemes are known. For example, in a BLSR protection scheme, in the event of a fault, wavelengths travelling in one direction around the ring are switched to another fiber to enable them to reverse direction around the ring to reach their destination node. Traffic can be passed from one ring to another via electrical interfaces, or by optical interfaces having fixed preconfigured wavelength selections or by full featured reconfigurable optical switches with fault monitoring and protection switching capability.

It is known to use WDM optical networks for use in mobile backhaul networks. Current solutions for mobile backhaul networks may use L2/L3 switching with OEO (Optical-Electrical-Optical) conversion or microwave radio connections. The introduction of differentiated broadband services requiring low latency, the increase of the traffic load, the convergence of the mobile and fixed infrastructures, the need for sites consolidation and energy saving are all motivating the introduction of optical solutions in radio access and backhaul networks. This means packet processing is moved to the access and metro edge of the network and intermediate channel add-drop and ring interconnection is performed at the physical layer in the optical domain. Optical connections can help in saving energy, e.g. replacing switches for ring interconnection with ROADM based nodes or avoiding bridge sites. This is particularly so where protection is provided, in H-RAN parts for example. This implies equipment duplication.

As radio access networks (RAN) are evolving, the accompanying backhaul technologies are also being adapted constantly to meet the required cost-performance curve. The evolution in the RAN backhaul is today meeting the proven advantages of using optics in simplifying the network layer: transparency, availability of new low cost components and integrated systems, infrastructure scalability by easy increasing of number of channels and bit rates on the same network, long distance reaches facilitating site consolidation/convergence and low latency.

However the RAN access points (i.e. antenna towers and small cells) are geographically sparse: complex topologies are needed to pick-up the mobile traffic where it is. The DWDM technology is the ideal solution, natively providing a multi-channel transport (the "wavelength comb"). However a combination of DWDM rings and trees shall be considered to cover all the backhaul area. Network operators are straining to meet the stringent latency and increased capacity requirements of LTE and to be prepared to the next step: the $5^{th}$ Generation (5G) communications network. For modernizing mobile backhaul solutions, such as evolving from SONET/SDH or ATM backhaul to packet, it's required to have a physical layer able to provide big and scalable pipes from the client side to the service edge. Optical technology has advantages for this, being natively broadband, scalable, and transparent. However it is perceived as costly and complex.

SUMMARY

Embodiments of the invention provide improved methods and apparatus. According to a first aspect of the invention, there is provided a method of using an optical communications network having an interconnecting node coupled in between at least one hub node and at least first and second access nodes. A first working optical path and a first protection optical path are provided between the interconnecting node and the first access node. A second working optical path and a second protection optical path are provided between the interconnecting node and the second access node. A hub working optical path and a hub protection optical path are provided between the hub and the interconnecting node. A working wavelength selective switch is provided to select which wavelengths are coupled optically between the hub working optical path and either of the first and second working optical paths, and a protection wavelength selective switch is provided to select which wavelengths are coupled optically between the hub protection optical path and either of the first and second protection optical paths. The method has steps of sending traffic between the first access node and the hub node on a selected wavelength set up through the working wavelength selective switch, and the first working optical path and the hub optical working path. In the event of detection of a fault, protection switching of the traffic is carried out at the first access node and the hub node to send that traffic on a selected wavelength set up through the protection wavelength selective switch, and the first protection optical path, and the hub protection optical path. The protection switching is carried out without altering the selections made by the wavelength selective switches in the interconnecting node.

By having an interconnecting node which is wavelength selective, protection schemes for more than one access node can be handled, so as to extend across the interconnecting node between the hub and access sides. By having an interconnecting node which does not alter its predetermined configuration of wavelength selections to implement a protection switching operation, the complexity of such nodes and thus costs can be reduced, since no fault monitoring or rapid communication or control is needed at the interconnecting node. Notably such protection schemes can be applied to rings or trees or other topologies on either side of the interconnecting node.

Any additional features can be added, and some are described below and set out in dependent claims. One such additional feature is the preliminary step of causing wavelengths to be set up for sending and protecting traffic between the first access node and the hub node by remotely configuring the working wavelength selective switch, and by remotely configuring the protection wavelength selective switch.

By having remote reconfiguration of wavelength selection the OPEX costs of manual reconfiguration, and associated increased optical losses of connectors can be avoided.

Another such additional feature is a step of using the interconnecting node for selectively coupling wavelengths between the first working optical path and the first protection optical path, so as to operate the first working optical path and the first protection optical path as an access bidirectional optical ring, and the step of switching the traffic in the event of a fault comprises sending the traffic in the other direction around the access bidirectional optical ring. This enables such optical rings to be interconnected and for protection paths to extend beyond each ring. This can help avoid the need for multiple protection schemes for each working path and thus simplify the protection and keep costs lower.

Another such additional feature is the interconnecting node also having a hub ring path between the working wavelength selective switch and the protection wavelength selective switch, and the method comprises operating the hub ring path and the hub working optical path and the hub protection optical path as a hub bidirectional optical ring, and the step of switching the traffic in the event of the fault detection comprises sending the traffic in the other direction around the hub bidirectional optical ring. This helps enable such optical rings to be interconnected and enables protection paths for such rings to be extended. This can help avoid the need for multiple protection schemes for each working path and thus simplify the protection and keep costs lower.

Another such additional feature is a step of monitoring to detect the fault, the monitoring being made away from the interconnecting node. This helps enable the protection to be carried out without any monitoring at the interconnecting node, so that a cost of the interconnecting node can be kept low.

Another such additional feature is the sending step comprising sending traffic in both directions over the working optical paths, and in the event of the fault detection, sending the traffic in both directions over the protection optical paths. This can help enable more efficient use of optical paths. Also it means there is a path for returning a fault indication to a source, and so no need for a separate control path to pass fault the indication to the source.

Another such additional feature is the step of using the interconnecting node also as an add drop node to couple local traffic with the optical communications network. This can enable the network to be coupled more efficiently to local sources or sinks of traffic.

Another aspect of the invention provides an optical communications network having an interconnecting node coupled in between at least one hub node and at least first and second access nodes, to provide a first working optical path and a first protection optical path between the interconnecting node and the first access node, and to provide a second working optical path and a second protection optical path between the interconnecting node and the second access node, and to provide a hub working optical path and a hub protection optical path between the hub and the interconnecting node. The interconnecting node has a working wavelength selective switch configurable to set up wavelengths for sending traffic between the first access node and the hub node by selecting which wavelengths are coupled optically between the hub working optical path and either of the first and second working optical paths. The interconnecting node has a protection wavelength selective switch configurable to set up wavelengths for sending traffic between the first access node and the hub node by selecting which wavelengths are coupled optically between the hub protection optical path and either of the first and second protection optical paths. The first access node and the hub node each have a switch to send the traffic on the selected wavelength set up through the working wavelength selective switch, and the first working optical path and the hub optical working path, and in the event of a fault detection, to carry out protection switching, to send that traffic on the selected wavelength set up through the protection wavelength selective switch, and the first protection optical path, and the hub protection optical path, wherein the interconnecting node is configured not to alter the selections made by the wavelength selective switches in response to the fault detection.

An additional feature is the interconnecting node having an interface for receiving configuration commands to remotely configure the working wavelength selective switch and the protection wavelength selective switch to set up wavelengths for sending and protecting traffic between the first access node and the hub node.

Another such additional feature is the interconnecting node also having a first access wavelength selective switch system for selectively coupling wavelengths between the first working optical path and the first protection optical path, such that the first working optical path and the first protection optical path are operable as an access bidirectional optical ring, and the switch of the first access node is configured to switch a direction of the traffic in the event of a fault in the other direction around the access bidirectional optical ring. This enables such optical rings to be interconnected and for protection paths to extend beyond each ring. This can help avoid the need for multiple protection schemes for each working path and thus simplify the protection and keep costs lower. In some cases a similar module can be used for the access wavelength switch system and for the working WSS and the protection WSS to enable increased standardization of parts and thus reduce manufacturing and maintenance costs.

Another such additional feature is the interconnecting node also having a hub ring path between the working wavelength selective switch and the protection wavelength selective switch, such that the hub ring path and the hub working optical path and the hub protection optical path are operable as a hub bidirectional optical ring, and such that in the event of a fault, the hub node and the interconnecting node are arranged such that the traffic is passed in the other direction around the hub bidirectional optical ring. This helps enable such optical rings to be interconnected and enables protection paths for such rings to be extended. This can help avoid the need for multiple protection schemes for each working path and thus simplify the protection and keep costs lower.

Another such additional feature is a second interconnecting node coupled in the hub bidirectional optical ring. This helps enable multiple access nodes to be coupled, and enables their protection schemes to be extended, or enables a redundant interconnecting node for improved resilience.

Another aspect provides an interconnecting node for use in the optical communications network, the interconnecting node having a working wavelength selective switch configurable to set up wavelengths for sending traffic between the first access node and the hub node by selecting which wavelengths are coupled optically between the hub working optical path and either of the first and second working optical paths. The interconnecting node also has a protection wavelength selective switch configurable to set up wavelengths for sending traffic between the first access node and the hub node by selecting which wavelengths are coupled optically between the hub protection optical path and either of the first and second protection optical paths, for use in the event of protection switching triggered by detection of a fault. The interconnecting node is configured not to alter the selections made by the wavelength selective switches in response to the fault detection.

An additional feature is the interconnecting node also having a first access wavelength selective switch system for selectively coupling wavelengths between the first working optical path and the first protection optical path, such that the first working optical path and the first protection optical path are operable as an access bidirectional optical ring, and the switch of the first access node is configured to switch a direction of the traffic in the event of a fault in the other direction around the access bidirectional optical ring. This enables such optical rings to be interconnected and for protection paths to extend beyond each ring. This can help avoid the need for multiple protection schemes for each working path and thus simplify the protection and keep costs lower.

An additional feature is the access wavelength selective switch system comprising a working access wavelength selective switch and a protection access wavelength selective switch, and an access ring path between them, such that these wavelength selective switches are configurable to select which of the wavelengths are passed around the access bidirectional optical ring, and which are passed between the hub node and the access nodes. This use of a pair of wavelength selective switches enables simpler optical devices to be used and thus costs to be kept low.

An additional feature is a hub optical path between the working wavelength selective switch and the protection wavelength selective switch, such that the hub working optical path and the hub protection optical path are operable as a hub bidirectional optical ring, and such that in the event of a fault, the hub node and the interconnecting node are arranged such that the traffic is passed in the other direction around the hub bidirectional optical ring.

This helps enable such optical rings to be interconnected and enables protection paths for such rings to be extended. This can help avoid the need for multiple protection schemes for each working path and thus simplify the protection and keep costs lower.

Another such additional feature is the interconnecting node being configured to pass the traffic without monitoring to detect the fault. This is notable for reducing complexity of the interconnecting node, which can make it more scalable to larger networks and helps keep costs low, especially in combination with the feature of not needing to alter the configuration in response to the fault detection.

Another such additional feature is an add drop port to couple local traffic with the optical communications network. This can enable the network to be coupled more efficiently to local sources or sinks of traffic.

Another such additional feature is a packet aggregation part coupled to the add drop port configured to carry out packet aggregation on part of the traffic dropped at the add drop part, and configured to pass the part of the traffic after packet aggregation to the add drop port to be added back into its path in the optical communications network. This can enable more efficient use of network resources. In principle the aggregation can be on traffic in either direction. Aggregation is intended to encompass also disaggregation.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 15 shows a schematic view of a network according to an embodiment, used in a mobile backhaul environment.

DETAILED DESCRIPTION

Figure 1:
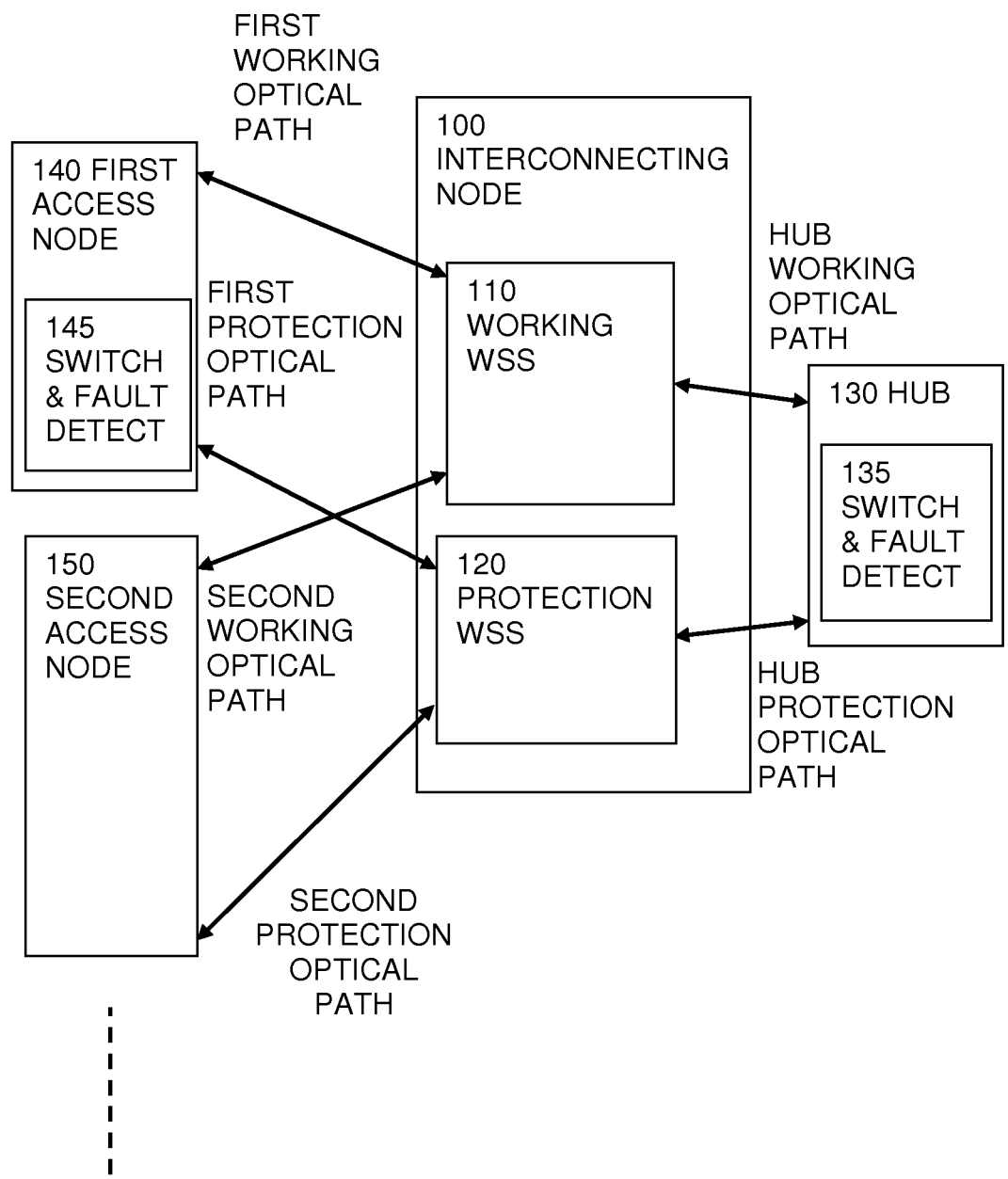
FIG. 1 shows a schematic view of a network having an interconnecting node according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to base stations are intended to encompass any kind of base station, not limited to those of any particular wireless protocol or frequency, and not limited to being located at a single location and so can encompass distributed base stations having functions at different locations or shared functions in a computing cloud shared between multiple base stations.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Abreviations:
ATM Asynchronous Transfer Mode
BSC Base Station Controller
BLSR Bidirectional Line-Switched Ring
CPRI Common Public Radio Interface
DL Downlink
DS Downstream
DWDM Dense WDM
GPON Gigabit Passive Optical Network
HRAN High RAN
IN Interconnecting Node
LRAN Low RAN
L2/L3 OSI Layer 2/layer 3
LTE Long Term Evolution
MU Main Unit
OBSAI Open Base Station Architecture Initiative
OEO Optical-Electrical-Optical
OPEX Operational Expenditure
P2P Point To Point
RAN Radio Access Network
RBS Radio base Station
RE Radio Equipment
REC Radio Equipment Controller
RF Radio Frequency
RNC Radio Network Controller
ROADM Reconfigurable Optical Add Drop Multiplexer/demultiplexer
RRU Remote Radio Unit
SGW Serving Gateway
SDH Synchronous Digital Hierarchy
SONET Synchronous Optical Networking
UL Uplink
US Upstream
WDM Wavelength Division Multiplexing
WSS Wavelength Selective Switch Introduction By way of introduction to the embodiments, some issues with conventional designs will be explained. A problem with current optical solutions, is making the optical systems simple and cheap: backhaul is not considered in the same manner as core parts of a network, so cost constraints are more stringent in the backhaul area of application.

Some problems with existing optical solutions are the unsatisfactory cost level (partly since photonic integration is not yet practicable for such complex systems), the not simple correlation of monitoring and recovery actions, latency levels not always being adequate for the transported client signals, the full and optimal exploitation of the optical bandwidth especially when intermediate aggregation at higher layers are avoided.

To address these issues, particularly for an interconnecting node (IN) to be used for example in the context of Radio Access Network (RAN) transport area, embodiments as described below can have features such as setting up wavelength and protection paths between access nodes and a hub node through WSS parts in the IN and carrying out protection switching at the relevant access node and at the hub without altering the selections made by the WSS in the IN. The IN can thus connect more than one access rings/trees to a metro/aggregation ring/tree with an extremely simple failure reaction mechanism at wavelength level. In some cases no monitoring devices are required in the IN.

In some embodiments the IN is based on the replication and combination of the same Basic Module (BM) following simple, modular, and composition rules. The BM can use small WSSs. Silicon photonic integration becomes much more practical for such a simple or modular arrangement in the IN. In some embodiments, packet aggregation and local add/drop are possible options.

Figure 2:
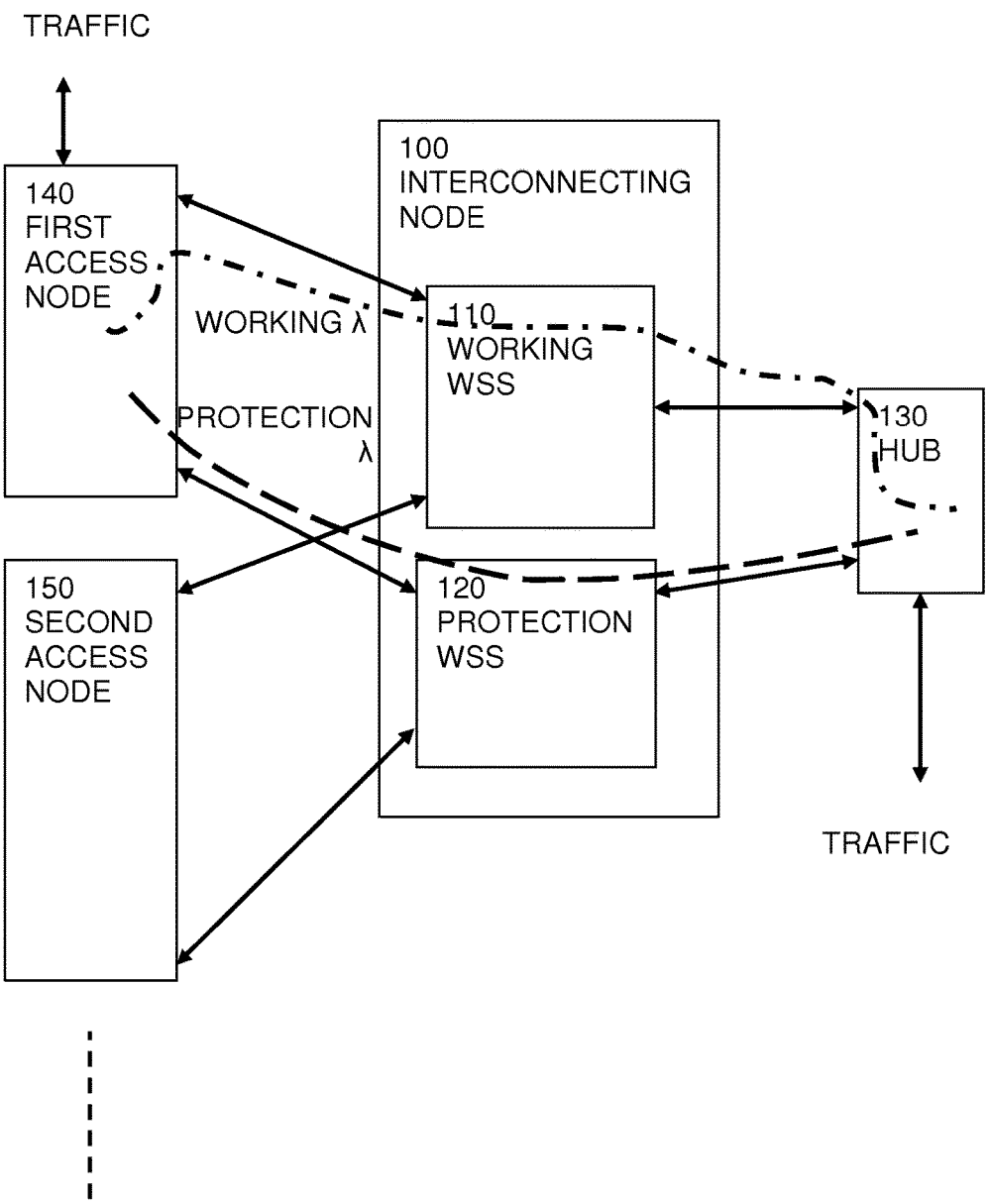
FIG. 2 shows a schematic view of a similar network, showing paths followed by some wavelengths.
Figure 3:
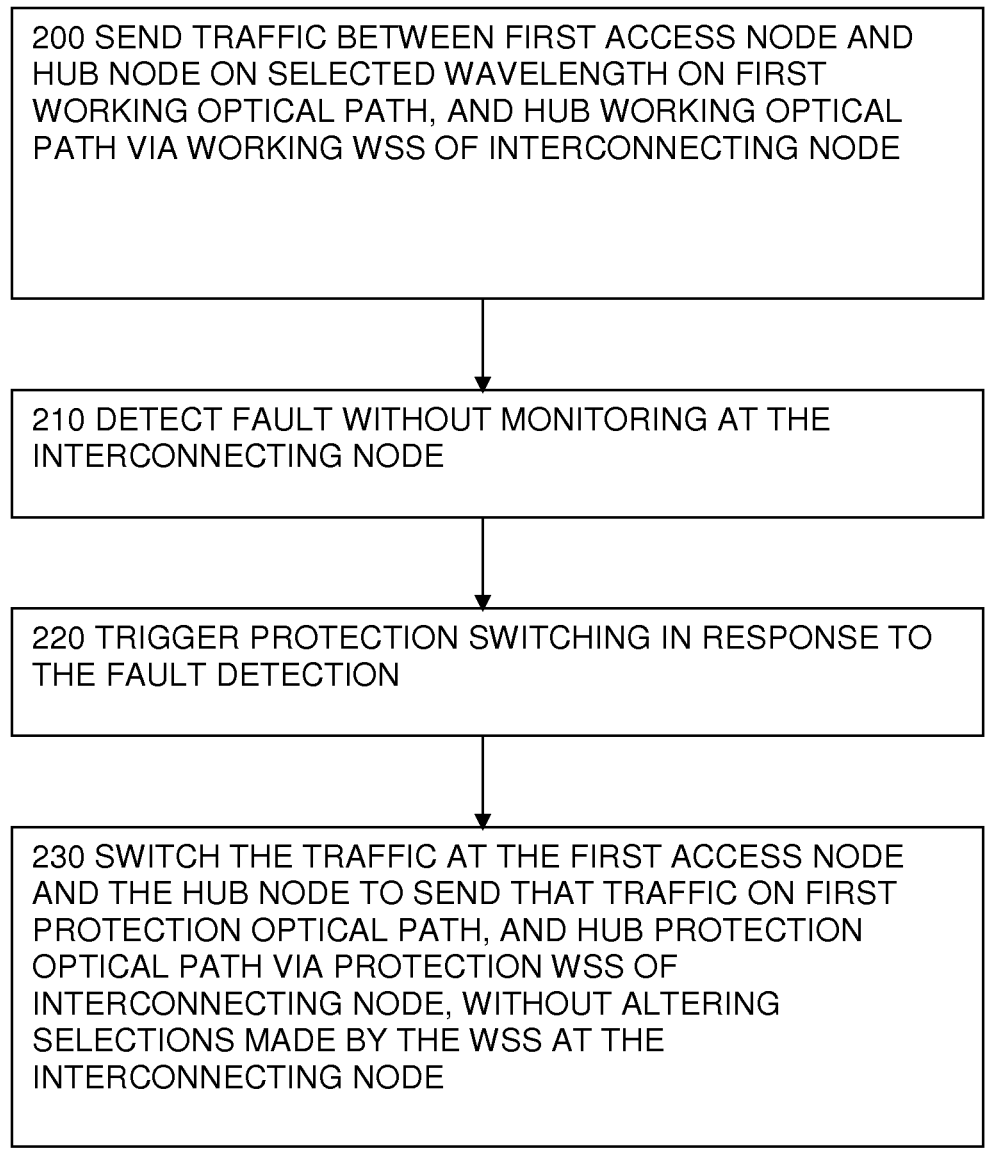
FIG. 3 shows steps of a method according to an embodiment.

FIGS. 1, 2, 3, Embodiment Showing Interconnecting Node

With reference to FIG. 1 an optical communications network in one embodiment of the present invention is illustrated. The optical communications network has an interconnecting node 100 coupled in between at least one hub node 130 and at least first 140 and second 150 access nodes, to provide a first working optical path and a first protection optical path between the interconnecting node and the first access node, and to provide a second working optical path and a second protection optical path between the interconnecting node and the second access node, and to provide a hub working optical path and a hub protection optical path between the hub and the interconnecting node. The interconnecting node has a working wavelength selective switch 110 configurable to set up wavelengths for sending traffic between the first access node and the hub node by selecting which wavelengths are coupled optically between the hub working optical path and either of the first and second working optical paths. The interconnecting node has a protection wavelength selective switch 120 configurable to set up wavelengths for sending traffic between the first access node and the hub node by selecting which wavelengths are coupled optically between the hub protection optical path and either of the first and second protection optical paths. The first access node and the hub node each have a switch, 135, 145, to send the traffic on the selected wavelength set up through the working wavelength selective switch, and the first working optical path and the hub optical working path, and in the event of a fault detection, to carry out protection switching, to send that traffic on the selected wavelength set up through the protection wavelength selective switch, and the first protection optical path, and the hub protection optical path, wherein the interconnecting node is configured not to alter the selections made by the wavelength selective switches in response to the fault detection.

FIG. 1 shows a schematic view of an embodiment having an interconnecting node IN 100 coupled between a hub 130, and at least a first access node 140 and a second access node 150. As shown, there is a first working optical path and a first protection optical path between the first access node and the IN. Similarly for the second access node there is there a second working optical path and a second protection optical path between the second access node and the IN. In the IN there is a working WSS 110 which selects which wavelengths are coupled from either of the access nodes, on the first and second working optical paths, to the hub working optical path and therefore to the hub 130. Similarly for the protection paths, there is a protection WSS 120 which selects which wavelengths are coupled from either of the access nodes, on the first and second protection optical paths, to the hub protection optical path and therefore to the hub 130. Although two access nodes are shown, there can be many more. Although no intermediate nodes are shown between the access nodes and the interconnecting node, there can of course be many such intermediate nodes. Likewise there can be such intermediate nodes between the hub node and the interconnecting node.

FIG. 1 also shows a switch and fault detection part 145 in the first access node, for carrying out the fault detection and protection switching, to move traffic to the protection path in the event of a fault. In principle the fault detection can be located elsewhere along the working path and arranged to communicate a fault detection to the end points where the protection switching is carried out. A similar part 135 is shown in the hub node. This enables the protection switching to be carried out without needing any action from the IN, thus the IN can be made as a simpler device than would be the case if it was involved in the protection switching. The wavelengths set up for the protection path can remain lit but unused while there is no fault, or in principle can be used for lower value "best effort" traffic until the protection switching is triggered.

Furthermore, with reference to FIG. 1 an embodiment of an interconnecting node 100 for use in the optical communications network is shown. The interconnecting node 100 having a working wavelength selective switch 110 configurable to set up wavelengths for sending traffic between the first access node and the hub node by selecting which wavelengths are coupled optically between the hub working optical path and either of the first and second working optical paths. The interconnecting node also has a protection wavelength selective switch 120 configurable to set up wavelengths for sending traffic between the first access node and the hub node by selecting which wavelengths are coupled optically between the hub protection optical path and either of the first and second protection optical paths, for use in the event of protection switching triggered by detection of a fault. The interconnecting node is configured not to alter the selections made by the wavelength selective switches in response to the fault detection.

FIG. 2 shows a similar view to that of FIG. 1, and corresponding reference numerals have been used as appropriate. In FIG. 2 a dot-dash line shows a route of a wavelength set up as a working path for some traffic, between the first access node and the hub node. A dashed line shows a route of a wavelength set up as a protection path for that traffic.

FIG. 3 shows method steps according to an embodiment, using the interconnecting node as shown in FIG. 1 or other embodiments. As shown in FIG. 3, there is provided an embodiment of a method of using an optical communications network having an interconnecting node 100 coupled in between at least one hub node 130 and at least first 140 and second 150 access nodes. A first working optical path and a first protection optical path are provided between the interconnecting node and the first access node. A second working optical path and a second protection optical path are provided between the interconnecting node and the second access node. A hub working optical path and a hub protection optical path are provided between the hub and the interconnecting node. A working wavelength selective switch 110 is provided to select which wavelengths are coupled optically between the hub working optical path and either of the first and second working optical paths, and a protection wavelength selective switch 120 is provided to select which wavelengths are coupled optically between the hub protection optical path and either of the first and second protection optical paths. The method has steps of sending 200 traffic between the first access node and the hub node on a selected wavelength set up through the working wavelength selective switch, and the first working optical path and the hub optical working path. In the event of detection of a fault, protection switching 230 of the traffic is carried out at the first access node and the hub node to send that traffic on a selected wavelength set up through the protection wavelength selective switch, and the first protection optical path, and the hub protection optical path. The protection switching is carried out without altering the selections made by the wavelength selective switches in the interconnecting node.

At step 200 traffic is sent between first access node and the hub node on a selected wavelength on the first working optical path, and the hub working optical path. This uses the working WSS of the interconnecting node. At step 210 a fault is detected, without monitoring needing to occur at the interconnecting node. At step 220, protection switching is triggered in response to the fault detection. At step 230, the traffic is switched at the first access node and at the hub node to send that traffic on a wavelength previously set up on the first protection optical path and the hub protection optical path, via the protection WSS of the IN. This is done without altering the selections configured previously in the IN.

The following benefits or consequences can arise in the proposed arrangement of the IN and the protection switching scheme. It does not limit the interconnection to either trees or rings alone, either can be interconnected or they can be mixed. Also it does not limit the interconnection to a single access ring (or tree), multiple of them can be interconnected with a single IN to the same hub ring or hub tree for aggregation. Notably it can be arranged to ensure local traffic protection among nodes located on the same access ring. It can be arranged to ensure traffic protection among nodes, located on an access ring, and the hub node. Protection can always be carried out at the wavelength level: it can be arranged so that every single lightpath can be re-routed in case of failure. Furthermore, no monitoring components are required in the node; failure detection is done at the end point or other intermediate points.

The IN is more suitable for implementation in silicon photonic, or any integrated photonic technology, saving cost, power and footprint, as it has reduced complexity, and can be assembled from multiple similar modules.

One possible drawback is that it does not always manage the protection of two simultaneous failures (one in the access area and one in the metro/aggregation area). This event, however, can be considered very rare and, as soon as one of the two simultaneous failures is repaired, IN immediately protects the traffic from the remaining active failure.

Figure 4:
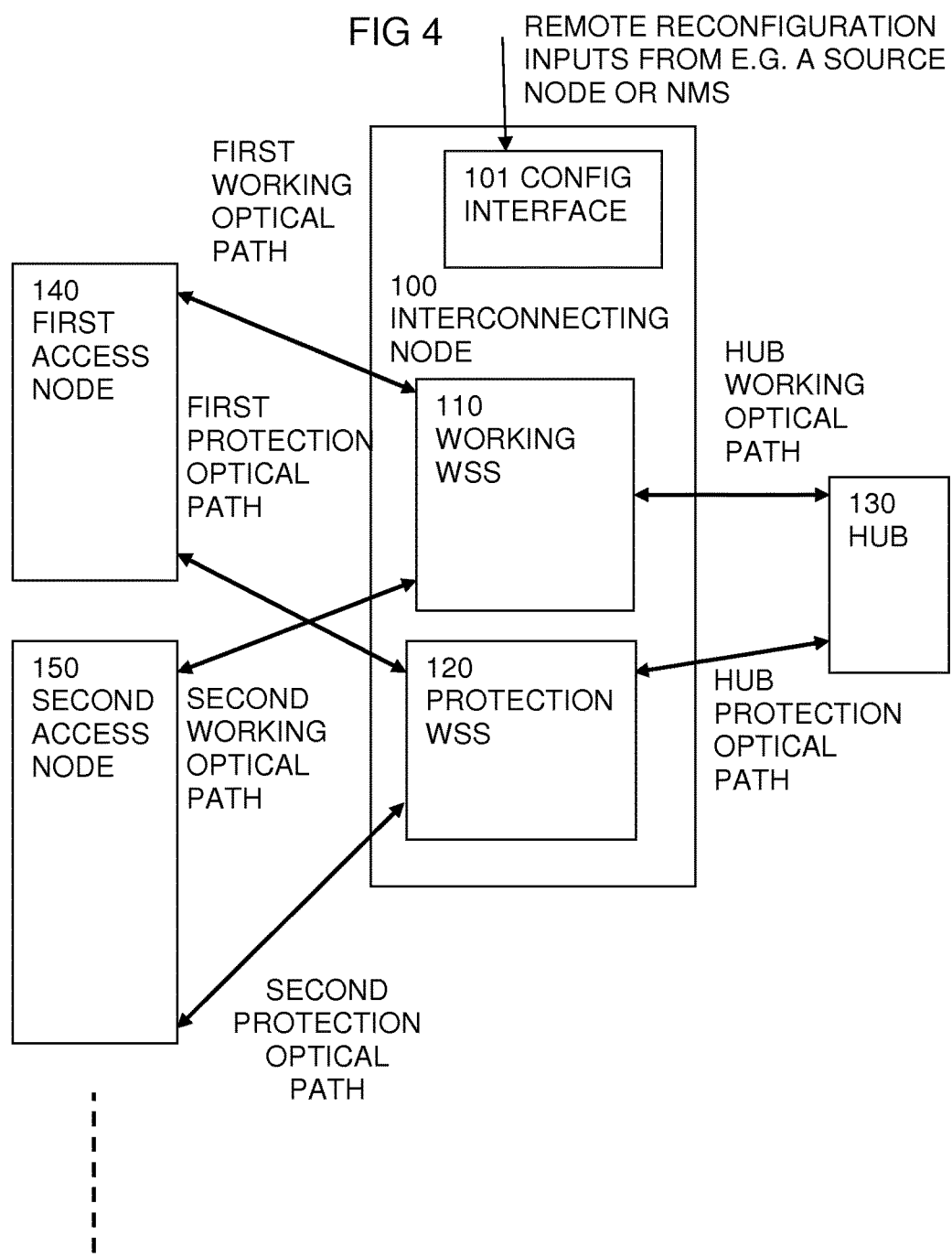
FIG. 4 shows a schematic view of a further embodiment.
Figure 5:
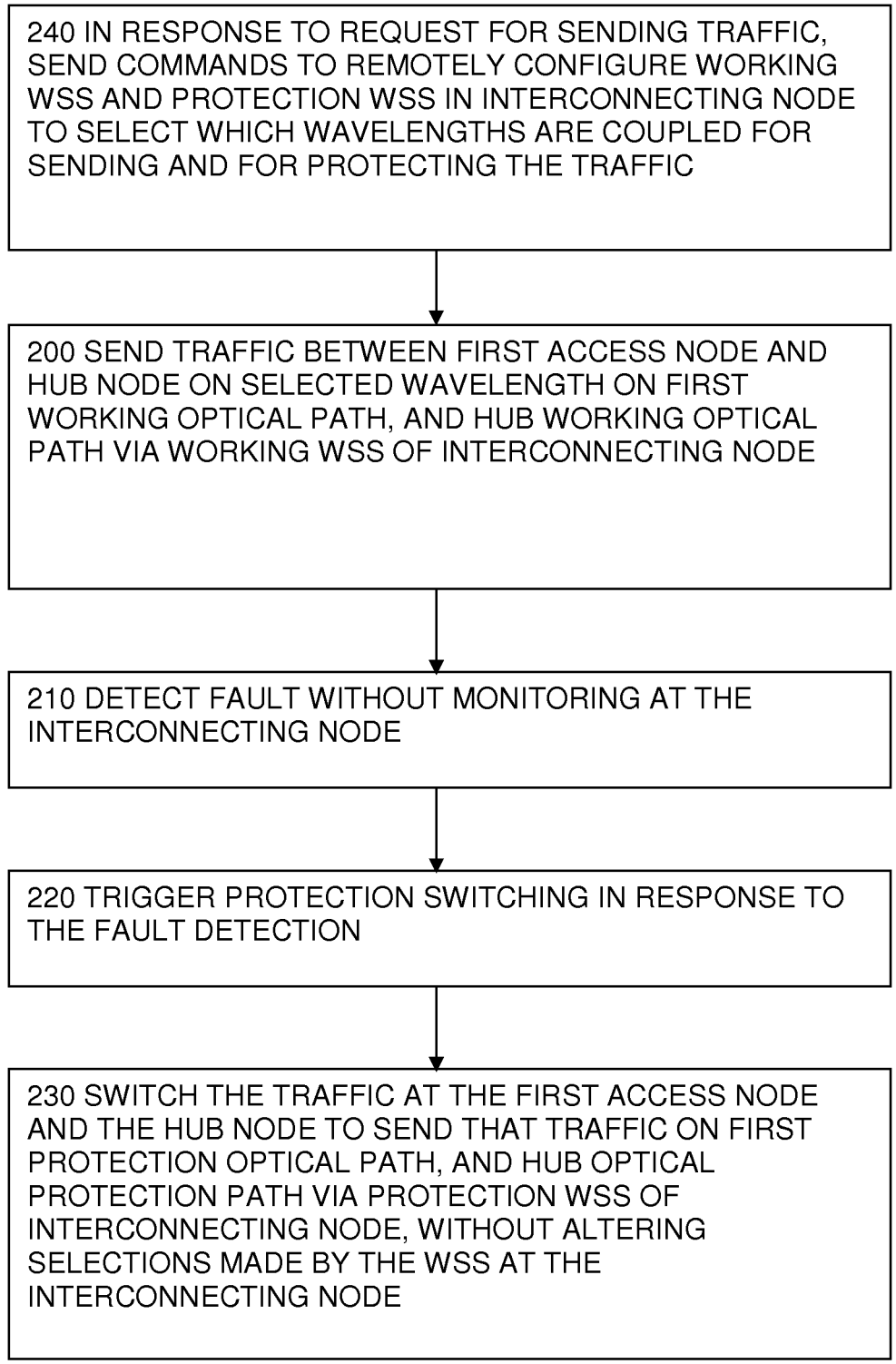
FIG. 5 shows steps of a method according to an embodiment.

FIGS. 4, 5 Embodiment Having Configuration Interface

FIG. 4 shows a similar view to that of FIG. 1, and corresponding reference numerals have been used as appropriate. In FIG. 4, to enable remote configuration of wavelength selection by the WSS devices, a configuration interface 101 is provided. This can be coupled to a control plane for example so as to receive configuration commands to set up a new wavelength for a new traffic request, between one of the access nodes and the hub node. The configuration commands can include commands for setting up both a wavelength along a working path and a wavelength along a protection path. The source of the configuration commands can be any entity involved in path computation, typically a path computation entity PCE is provided at any ingress node where the traffic joins the network, or is centralized in a network management system NMS.

FIG. 5 shows method steps according to an embodiment, using the interconnecting node as shown in FIG. 4 or other embodiments. At step 240, in response to a request to send traffic, commands are sent to remotely configure the working WSS and the protection WSS to select which wavelengths are coupled between the hub and the respective one of the access nodes. Once the wavelengths are set up, at step 200 the traffic is sent between first access node and the hub node on the selected wavelength on the first working optical path, and the hub working optical path, as described previously for FIG. 3. The subsequent steps 210, 220 and 230 are as shown in FIG. 3.

Figure 6:
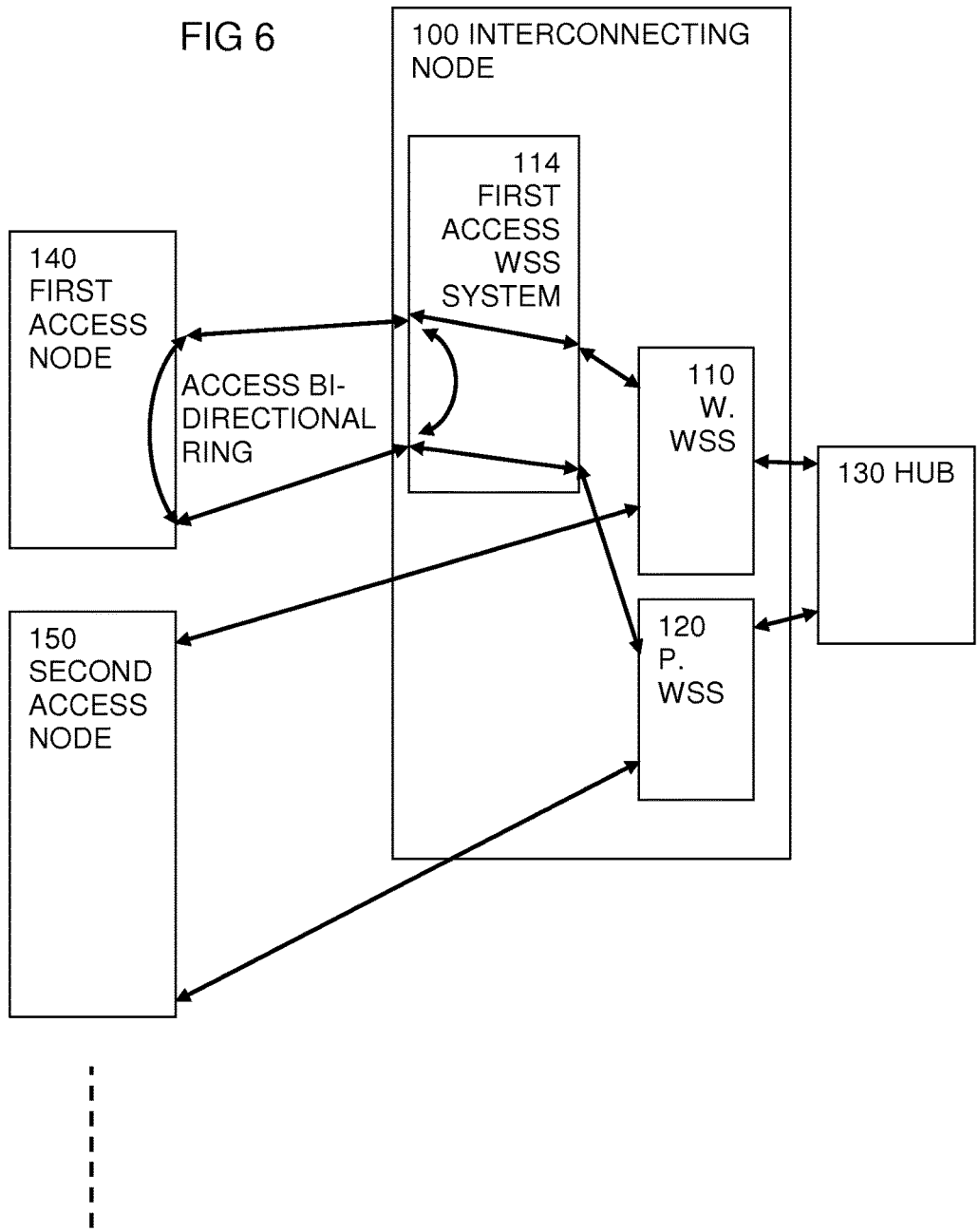
FIGS. 6 and 7 shows schematic views of a network according to an embodiment, showing a ring on the access side.
Figure 7:
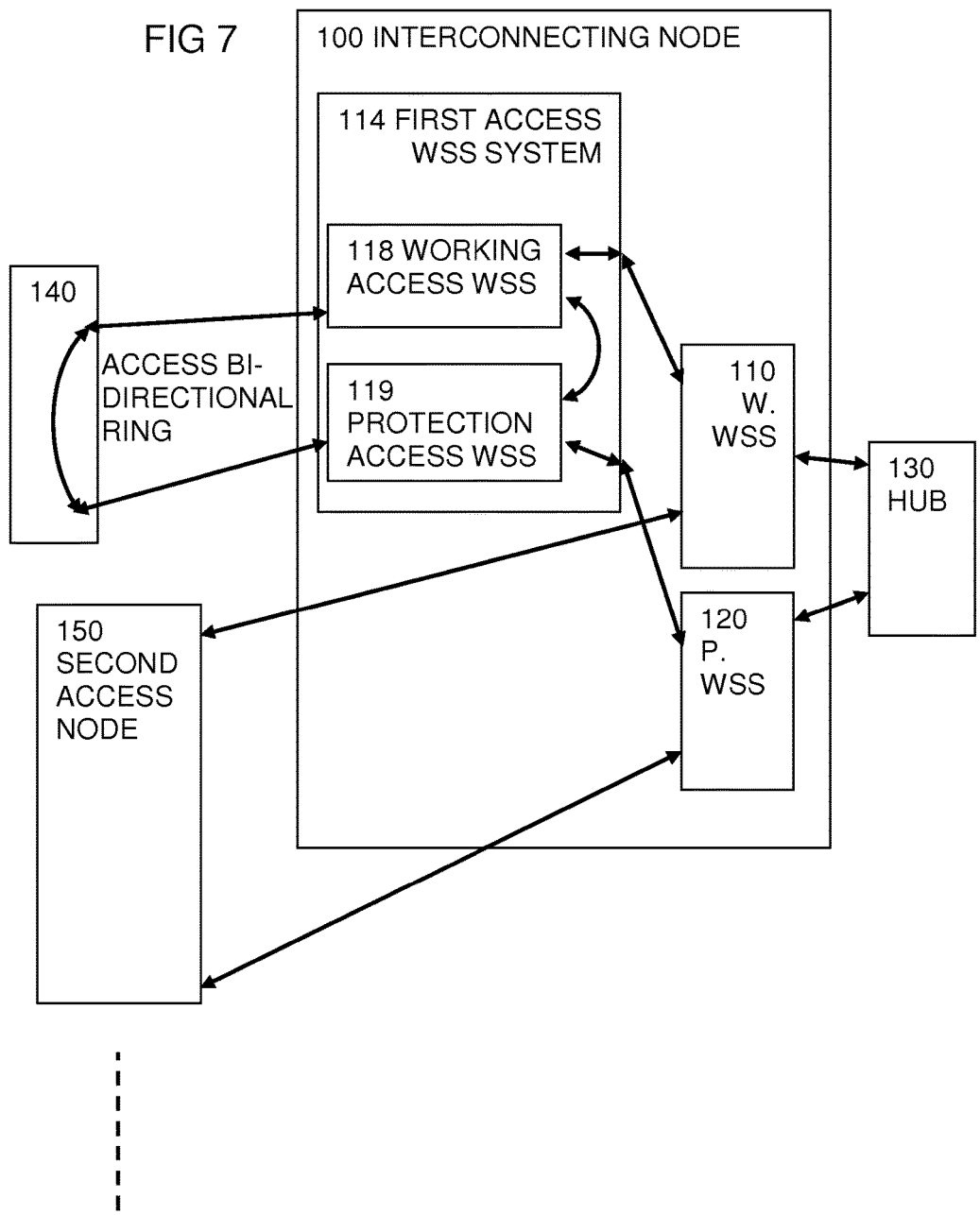

FIGS. 6, 7 Embodiments Having Ring on Access Side of Interconnecting Node

Embodiments can be envisaged with any combination of rings or trees on the access side of the interconnecting node, and ring or tree on the hub side. FIG. 1 above showed an arrangement which can be regarded as effectively a tree type topology on both sides of the interconnecting node. Now FIG. 6 shows a similar embodiment, but with a ring on the access side. This involves providing a pass through path in the interconnecting node for traffic passing around the ring without going to or from the hub, and another path for traffic which is to join or leave the ring at the interconnecting node, to go to or from the hub. As shown, one way of implementing this is to have a first access WSS system 114, which provides such a pass through path for the traffic passing around the ring. It is assumed that the ring is formed by the first working optical path and the first protection optical path, which means that using the working path involves the traffic using one sector of the ring, extending between the interconnecting node and the access node. The remainder of the ring is effectively the protection path, and so the protection switching at the access node can be carried out by changing the direction the traffic is sent around the ring or received from the ring.

In FIG. 6 the first access WSS system is inserted into the first working optical path and the first protection optical path. The arrangement of the working WSS and the protection WSS is otherwise the same as shown in FIG. 1. The first access WSS system selects which wavelengths are coupled to the working WSS and which are coupled to the protection WSS. Others of the wavelengths can be coupled so as to pass around the ring, by being coupled between the first working optical path and the first protection optical path. Note that only one access node is shown on the ring for the sake of clarity, but there can be many on the same ring, with appropriate wavelength selection so that different ones of the access nodes on the same ring use different wavelengths. The ring can be arranged for bidirectional traffic on the same fiber or can have separate fibers for each direction. There can be more than one interconnecting node on that ring, to couple it to different hubs if desired.

FIG. 7 shows a schematic view of a similar embodiment, this time showing one way of implementing the first access WSS system 114. This shows the system as having a working access WSS 118 and a protection access WSS 119, both of which can be 2:1 WSSs. The working access WSS has its "1" side port coupled to the first working optical path, and its "2" side ports coupled to the working WSS and to one of the "2" side ports of the protection access WSS 119. The other of the "2" side ports of the protection access WSS 119 is coupled to the protection WSS, and the "1" side port of the protection access WSS 119 is coupled to the first protection optical path. This arrangement of a pair of 2:1 WSSs is an efficient and compact way of achieving the operation described above for FIG. 6. It can enable a common or basic module to be repeated, thus helping make it more suitable for photonic integration. A possible alternative can be envisaged in which the ring path is achieved by having an optical path coupling between the hub side of the working WSS 110 and the hub side of the protection WSS 120, without needing the first access WSS system. This implies that these working and protection WSSs are 2:2 devices, which can be implemented as a pair of 2:1 WSSs coupled back to back. However a benefit of having the first access WSS system as shown in FIG. 7 is that the wavelengths selected for passing around the ring, never reach the working WSS 110 nor the protection WSS 120. Thus the same wavelengths can be reused by having the working WSS or the protection WSS select them for coupling the hub to others of the access nodes. This can simplify the wavelength selection planning and make more efficient use of the available wavelengths, compared to the possible alternative case.

Figure 8:
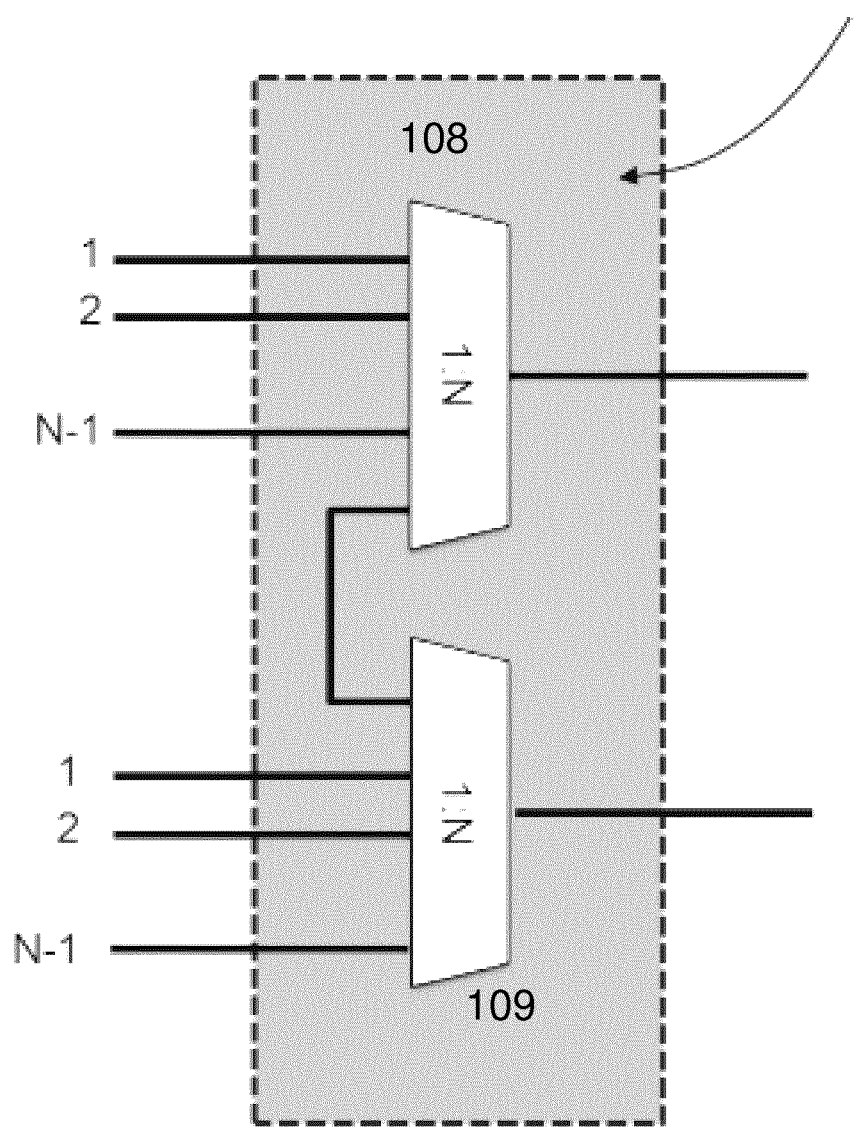
FIG. 8 shows a schematic view of a module for use in embodiments.

FIG. 8, Basic Module

FIG. 8 shows an example of a basic module which can be duplicated and coupled to build up the interconnecting node. It can be used to form the first access WSS system shown in FIGS. 6 and 7, and another one can be used to form the working and protection WSSs 110 and 120. The basic module has a pair of 1:N wavelength selective switches 108 and 109 which can be configured to select which wavelengths on the "1" port are coupled with which of the N ports. Thus in principle there could be different wavelengths from all the N paths coupled simultaneously to the "1" port, or all the wavelengths could be coupled to one of the N ports. Each wavelength can provide a bidirectional optical path for traffic. One of the N ports of part 108 is looped back to be coupled to one of the N ports of part 109. This enables the basic module to be used in a ring as shown in FIGS. 6 and 7 for example. The "1" ports of parts 108 and 109 are in that case coupled to the access node via the first working optical path and the first protection optical path. The port number 1 of the N ports of part 108 is coupled to the working WSS, and port numbers 2 to N−1 of part 108 are unused. Similarly port number 1 of the N ports of part 109 is coupled to the protection WSS, and port numbers 2 to N−1 of part 109 are unused. Hence for this case, N could be 2 or any number greater than 2. If the basic module is used to implement the working and protection WSSs 110 and 120, then N can be 3, or any number greater than 3, depending on how many access nodes are to be connected. The "1" ports of parts 108 and 109 would be coupled to the hub via the hub working optical path and the hub protection optical path respectively.

Figure 9:
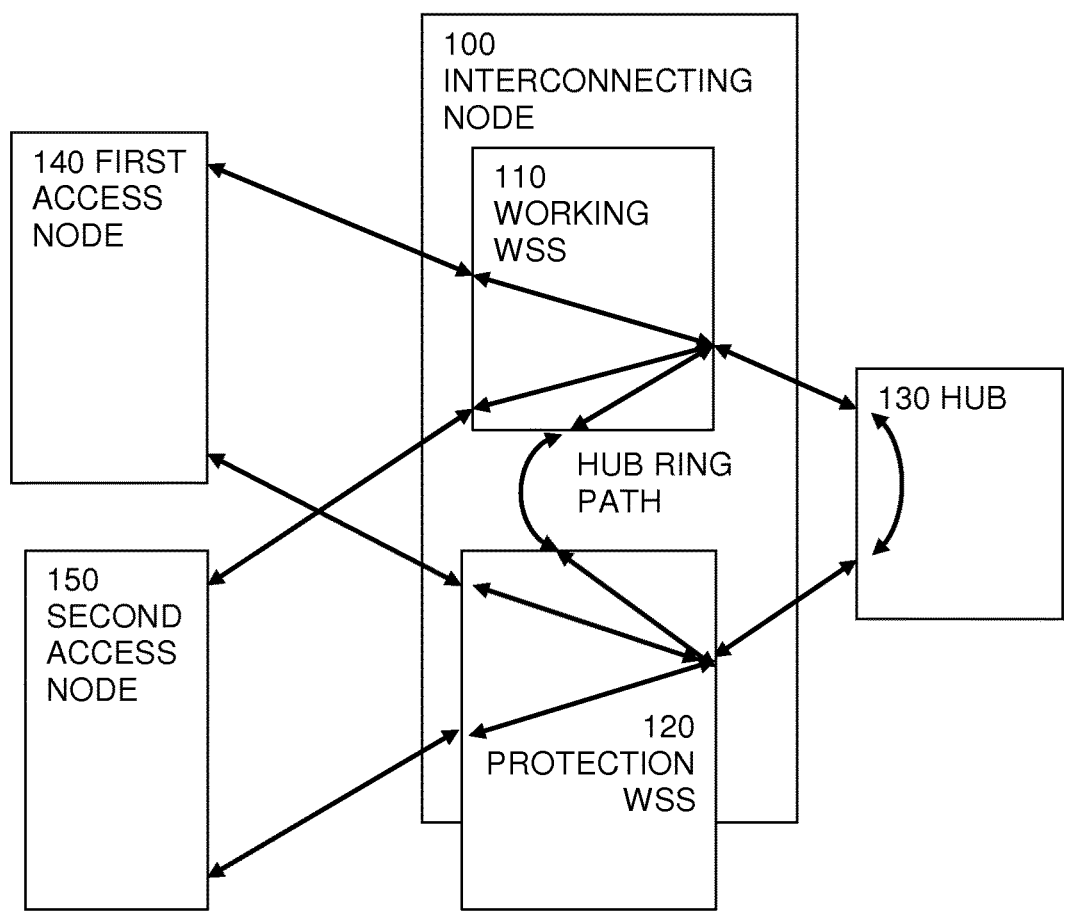
FIG. 9 shows a schematic view of a network according to an embodiment, showing a ring on the hub side.

FIG. 9, Ring on Hub Side

FIG. 9 shows a schematic view of another embodiment, showing a ring on the hub side of the interconnecting node. The ring is formed by the hub working optical path and the hub protection optical path and by a hub ring path which is coupled between one of the ports of the working WSS and loops back to one of the ports of the protection WSS. This means that selected wavelengths can pass around the ring, for use in passing traffic between multiple nodes on the ring. The working WSS and the protection WSS can be configured to pass such wavelengths around the ring. Other wavelengths can be used for traffic between the access nodes and the hub as described above. The hub can be configured also to pass some wavelengths around the ring, for use by other nodes on the ring (not shown), and to add or drop the wavelengths to be used for traffic to or from the access nodes. When protection switching of such traffic is triggered, the hub can be arranged to change which direction around the ring that traffic is added or dropped.

Figure 10:
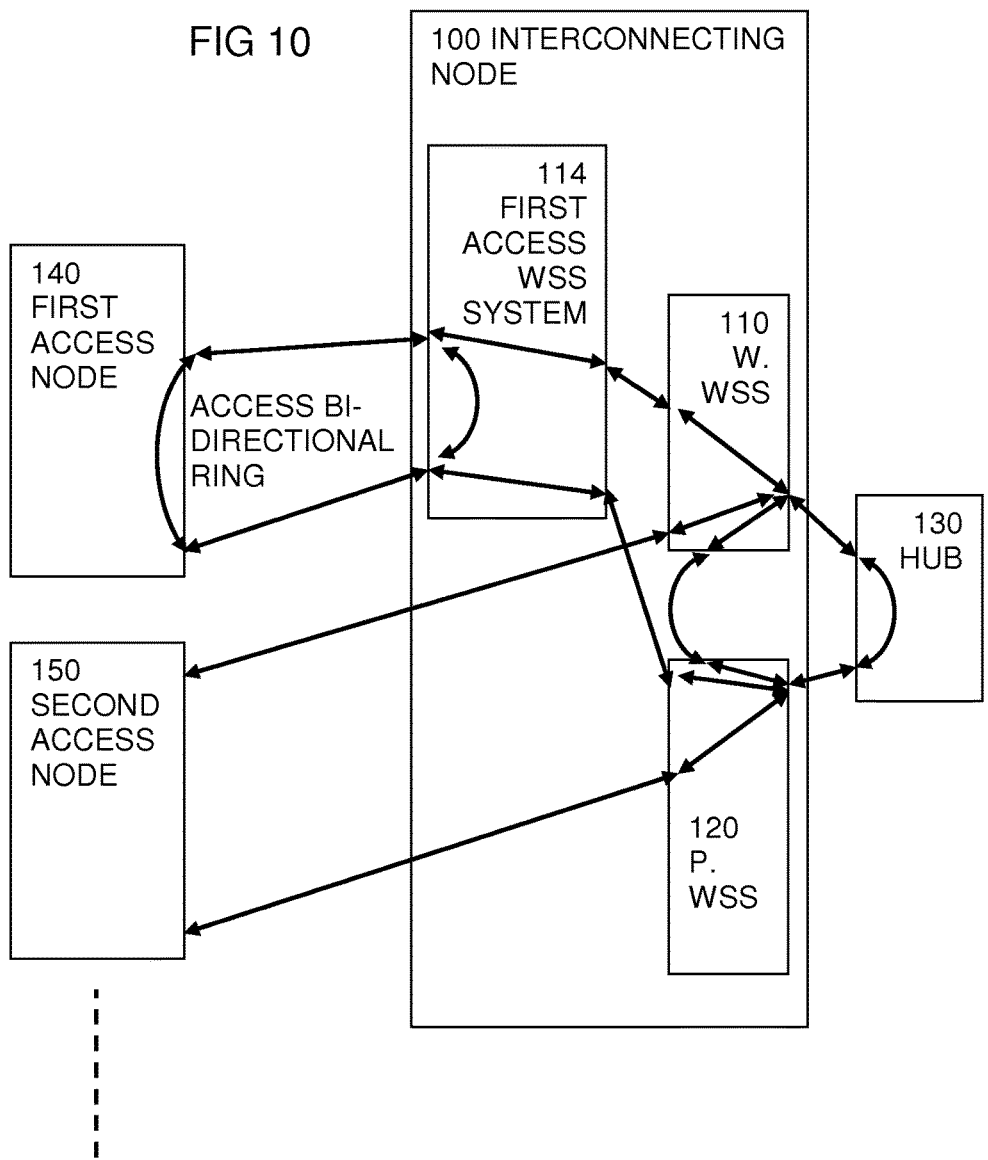
FIG. 10 shows a schematic view of a network according to an embodiment, showing rings on the hub side and on the access side.

FIG. 10, Rings on Both Sides

FIG. 10 shows a schematic view of a similar network to that of FIG. 9, but in this case there are rings on both the access side and on the hub side. This is effectively a combination of what has been described with regard to FIGS. 6 and 9, to show that they can be combined, and can operate as described above with respect to FIGS. 6 to 9. Although shown with only one ring on the access side, of course there can be any number of rings on the access side, or any combination of rings and trees.

Figure 11:
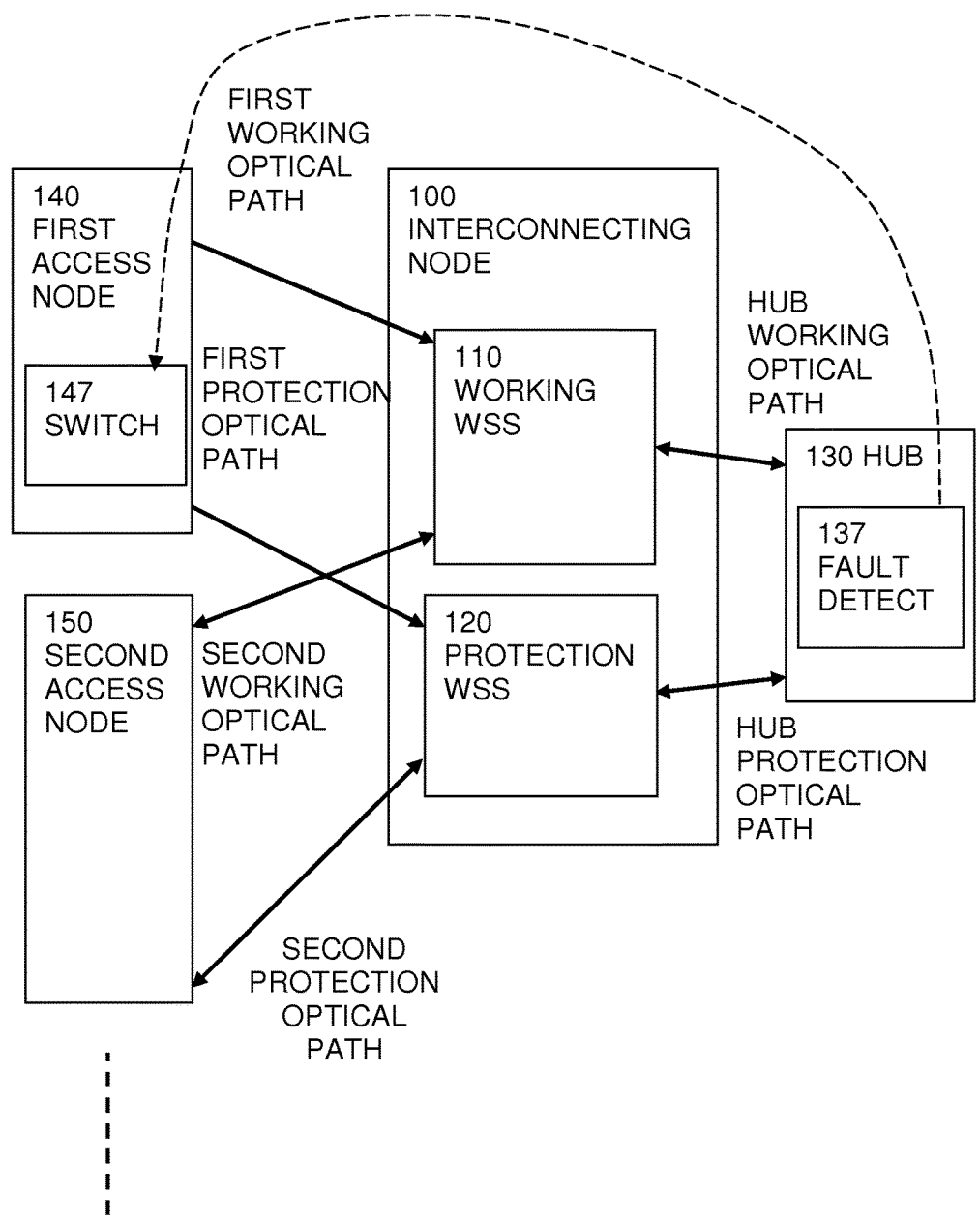
FIG. 11 shows a schematic view of a network according to an embodiment, showing a feedback path for fault detection.

FIG. 11, Feedback Path

FIG. 11 shows a schematic view of a network according to an embodiment, and showing with a dotted line, a feedback path for fault detection, from the hub back to the first access node. This would be useful for the case of a one directional optical path from the first access node to the interconnecting node for example, rather than the bidirectional paths discussed above. The features and benefits for embodiments described above can still be applicable to the one directional optical path case, but the other direction can no longer be used to pass back the fault detection information to trigger a protection switching. Hence a separate feedback path is provided, for example using a control plane or network management information paths or any other communication path. The feedback path is coupled from a fault detection part 137 shown in the hub, (or any intermediate node) to a protection switch part 147 in the first access node.

Figure 12:
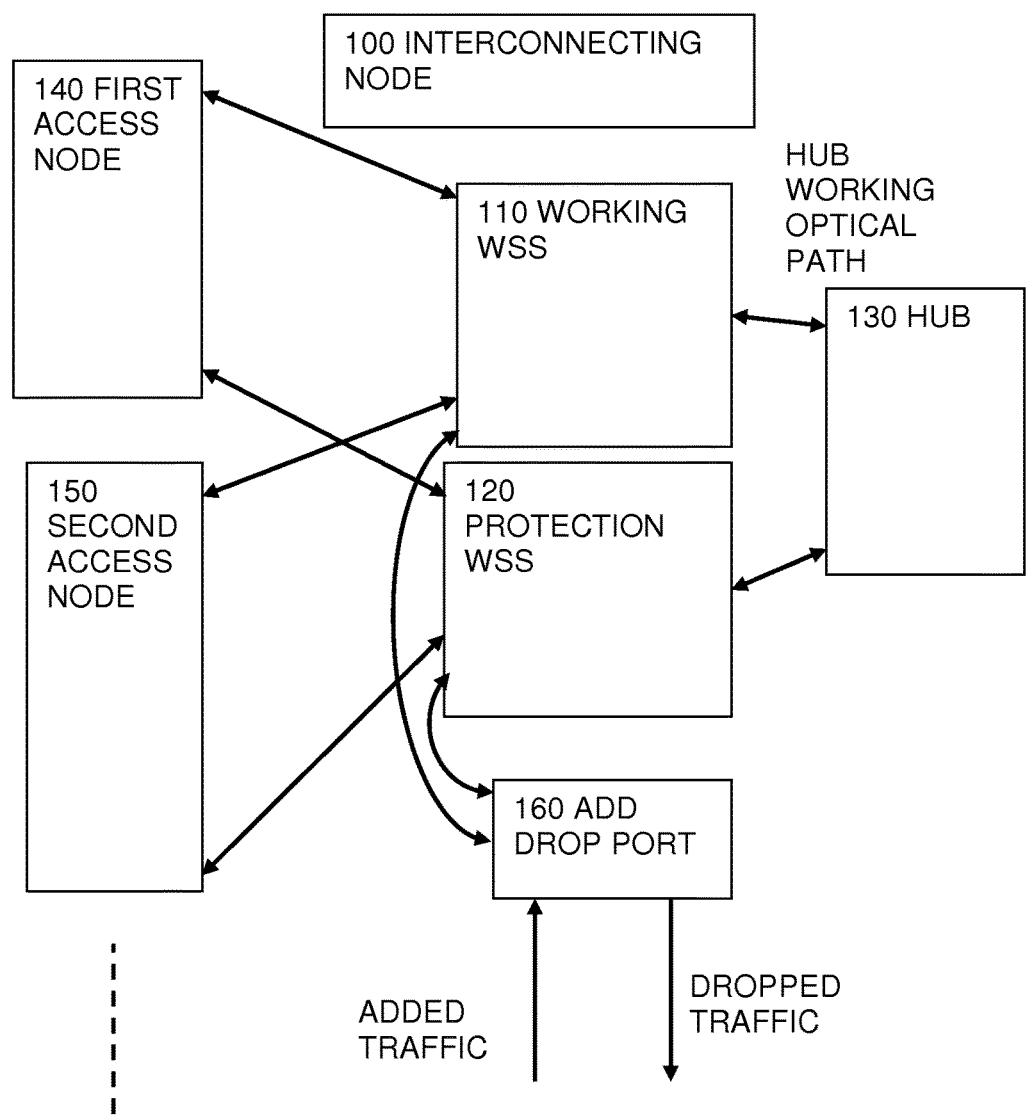
FIG. 12 shows a schematic view of a network according to an embodiment, showing an add drop port in the interconnecting node.

FIG. 12, Add Drop Port

FIG. 12 shows a schematic view of a network according to an embodiment, showing an add drop port 160 in the interconnecting node. This port is coupled to one of the ports of the working WSS and to one of the ports of the protection WSS. The add drop port can be configured to send or receive selected wavelengths for traffic to or from the hub, either via the working WSS and the hub working optical path, or via the protection WSS and the hub protection optical path.

Figure 13:
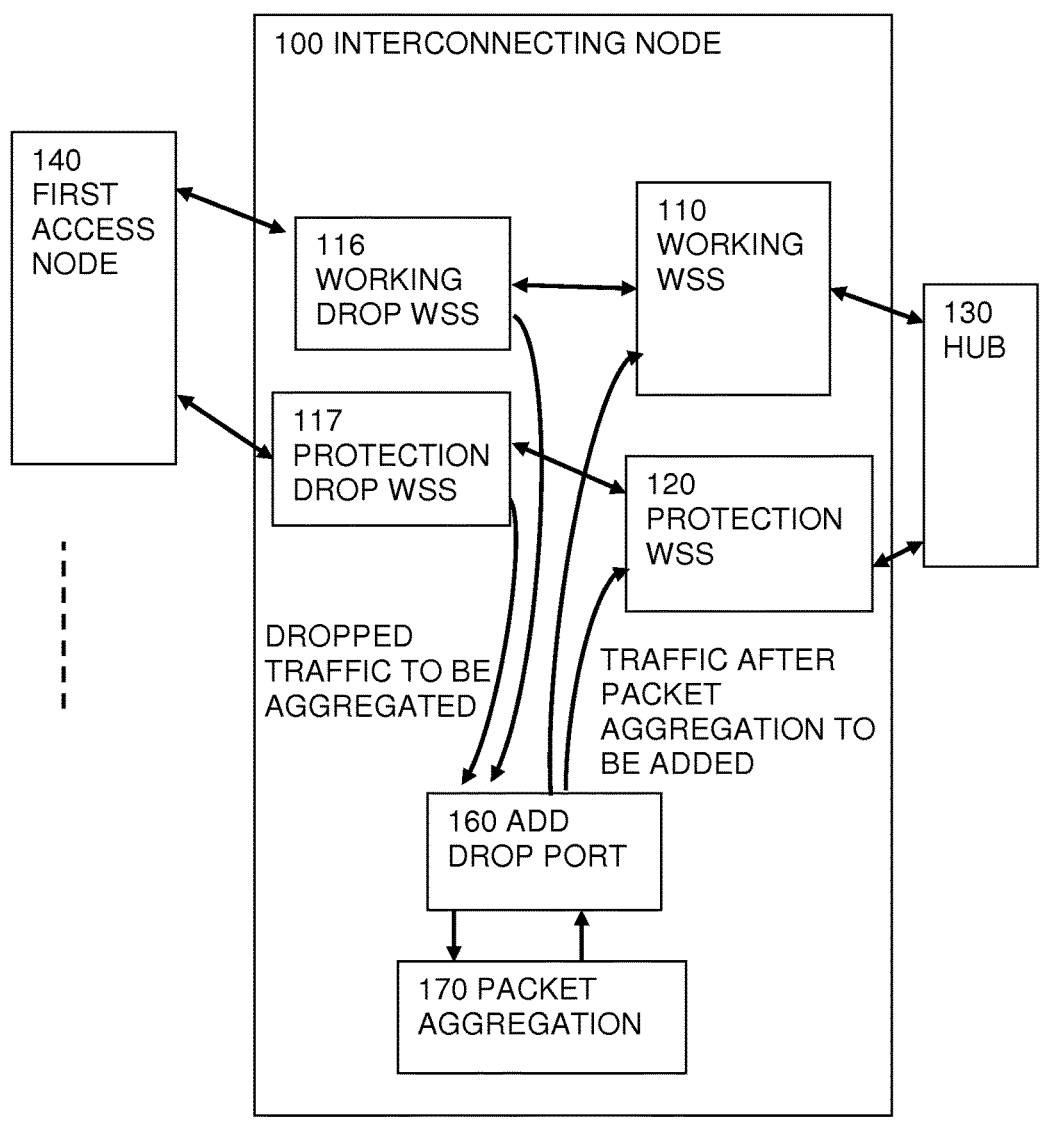
FIG. 13 shows a schematic view of a network according to an embodiment, showing a packet aggregation part.

FIG. 13, Packet Aggregation

FIG. 13 shows a schematic view of a network according to an embodiment, showing a packet aggregation part 170, coupled to the add drop port. To enable packet aggregation of traffic passing through the interconnecting node, the add drop port is coupled to the working and protection paths on the access side of the interconnecting node. This can be implemented by further WSS parts, shown as a working drop WSS 116 and a protection drop WSS 117, which can be 1:2 WSS parts, or can be implemented by the basic module of FIG. 8 for example. Wavelengths carrying traffic from the first access node having packets to be aggregated, are switched by the working drop WSS to the add drop port. From there they are passed to the packet aggregation part. The aggregated traffic is then returned via the add drop part to the working WSS 110, and from there to the hub. A similar configuration is provided for a protection path, extending from the first access node to the protection drop WSS 117, to the add drop part, then to the aggregation part 170. The aggregated packets are returned to the protection WSS 120 via the add drop port, and then to the hub. A similar aggregation scheme would also be set up in the other direction from the hub to the first access node and the aggregation part would carry out the inverse process of de-aggregating packets (not shown for the sake of clarity). In principle the aggregation could take place for traffic going to the access node, and disaggregation could take place for traffic going from the access node to the hub. Such packet aggregation can make more efficient use of bandwidth, so it is useful to be able to add it to a network where necessary.

Figure 14:
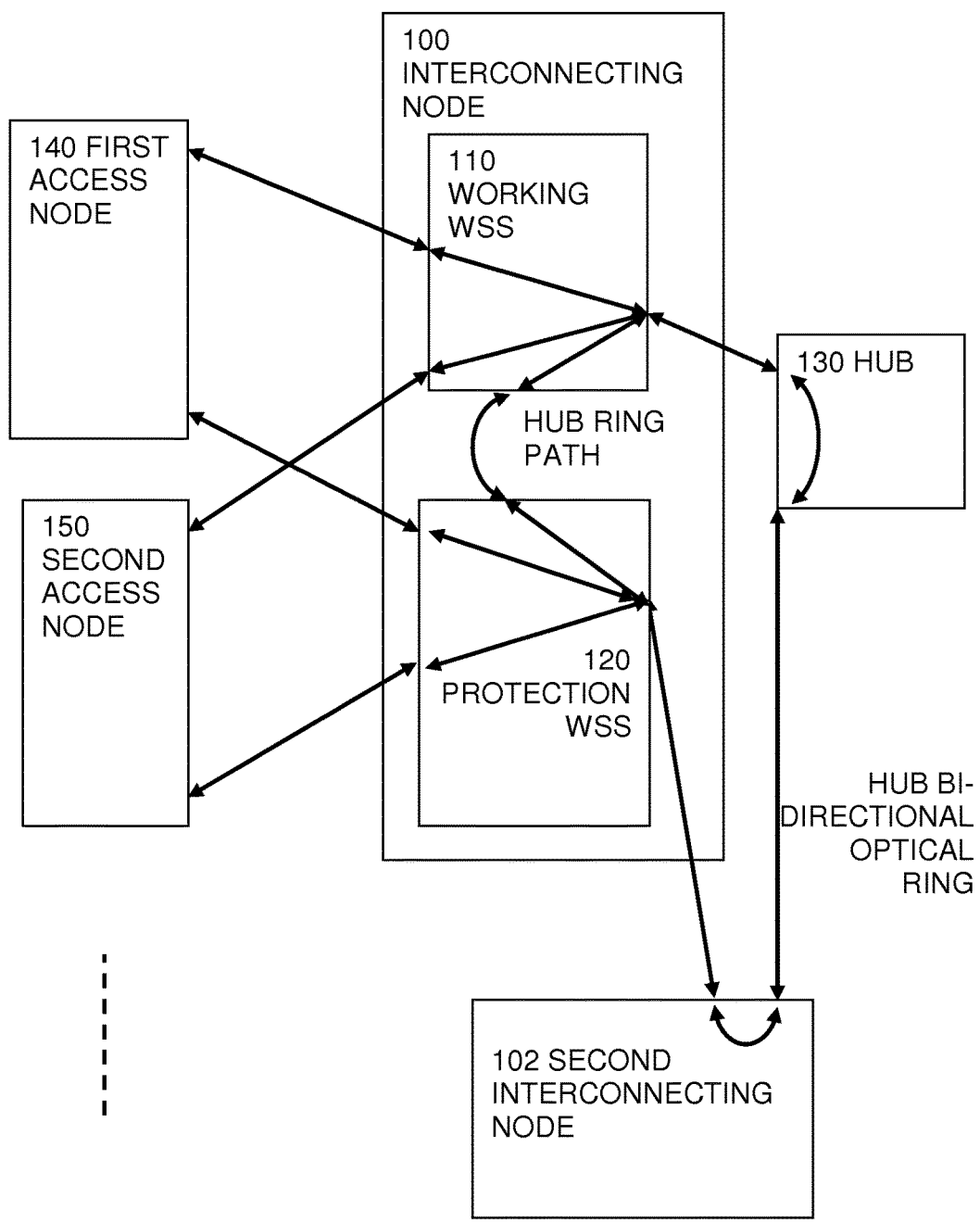
FIG. 14 shows a schematic view of a network according to an embodiment, showing a second interconnecting node on the hub ring.

FIG. 14, Second Interconnecting Node on Hub Ring

FIG. 14 shows a schematic view of a network according to an embodiment, similar to that of FIG. 9, and also showing a second interconnecting node 102 on the hub ring. This can either be used to interconnect more access side rings or trees to the same hub or hubs, or could be used as a redundant interconnecting node, in case of a failure of the first interconnecting node.

FIG. 15, Mobile Backhaul Environment

FIG. 15 shows a schematic view of a network according to an embodiment, used in a mobile backhaul environment. On the access side of the interconnecting node IN 100 are access rings for LRAN backhaul. Each ring can have multiple access nodes. As shown, a first access node 140 has at least RBSs 180, and a second access node 150 has a further RBS 180, at a different location. On the hub side is a metro/aggregation ring for HRAN backhaul. Coupled to the hub are service equipment such, for example, as a SGW 171, an RNC 173, a BSC 175 and a coupling to the rest of a core network 185. The hub node terminates the optical traffic towards the service equipment area. The case with tree topologies in the access side is also possible. The case with multiple rings in the metro/aggregation area is also possible.

It's possible to connect a packet aggregation add-on to consolidate traffic at the IN node, better exploiting the optical bandwidth, as described above in relation to FIG. 13. It's also possible to inject additional lightpaths directly in the node, if needed; in other words the node can be used not only as a by-pass point with interchange purposes but also to add/drop traffic locally at the node itself, as described above in relation to FIG. 12. Much of the interconnecting node can be implemented using a basic module as described above in relation to FIG. 8. In many radio access networks the radio base station is located concentrated at a single site. However, a radio base station can also have a distributed architecture. For example, a distributed radio base station (RBS) can take the form of one or more radio equipment (RE) portions that are linked to a radio equipment control (REC) portion over a radio base station internal interface.

Such distributed radio base stations can have a processing Main Unit (MU) at the REC, and at the RE a set of antennas with dedicated RF equipment able to cover multiple radio cells (RRUs), where a single MU is shared among multiple RRUs. This new architectural approach in the RBS implementation requires high capacity, cost effective and low latency transport systems between MU (processing) and RRUs (antennas).

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 5.0 (2011). Other interfaces can be used, for example the Open Base Station Architecture Initiative (OBSAI) but such alternatives have not yet proved as popular.

This approach of providing "remotization" of the RF part of the RBS from the main unit can bring advantages such as rationalization of RBS processing unit, with benefits in terms of cost and power consumption, dynamic allocation of RF and/or processing resources depending on cell load and traffic profiles, and correlation of data supported by all the antennas which are afferent on the same processing unit. It increases radio link reliability, bandwidth, and coverage and optimizes the power consumption. This can enable some "cloud computing" concepts to be applied to the radio access networks.

Point to point (P2P) optical links can be used for the interface between the baseband controller and radio head or heads. For this interface, WDM systems, can enable guaranteed low latency, protocol transparency, high bandwidth and an increased spectral efficiency. The costs, over a 2-5 year time scale projection, can be comparable with conventional optical access technologies, such as P2P and GPON. Nowadays they are realized through a standard protocol named CPRI, transmitted over P2P dedicated optical links. Notably CPRI has pressing constraints in terms of latency (round-trip delay) and in particular in terms of uplink/downlink synchronization.

The CPRI standard recites optical fibers for transmission link up to 10 km, recites determining a round trip delay, and specifies synchronisation and timing accuracies, e.g. link round trip delay accuracy of 16 nsecs.

Embodiments can provide a low cost optical node for a single fiber bidirectional WDM ring, or for interconnecting two rings in the radio access network (RAN). For example one ring can be in the low RAN (L-RAN) and a second ring in the high RAN (H-RAN). Compared to current solutions in the electrical domain, optical technology can ensure transparent service transport, minimal latency and high spectral efficiency. On the other hand, the cost of optical devices (e.g. ROADM) could be too high for a radio access network, so solutions cheaper than current WDM metro networks are desirable. Furthermore solutions should be able to minimize relative delay and synchronization issues between upstream and downstream directions.

Widespread in metro networks, DWDM technology can offer advantages in term of bandwidth capabilities and scalability also in mobile backhaul and radio access networks, especially considering broadband services and bandwidth request are increasing over time, in particular peak rate and cell load. WDM permits ultra-broad dedicated bandwidth and very low latency for each or a cluster of radio base stations. LRAN and HRAN networks are typically implemented with L2/L3 switches. Upgrading to use optical connections can help in saving energy, e.g. replacing switches for ring interconnection with ROADM based nodes or avoiding bridge sites. This is even more true considering ring protection in the HRAN that would normally require equipment duplication.

Current solutions for mobile backhaul networks use L2/L3 switching with OEO (Optical-Electrical-Optical) conversion or microwave radio connections. The introduction of differentiated broadband services requiring low latency, the increase of the traffic load, the convergence of the mobile and fixed infrastructures, the need for sites consolidation and energy saving are all reasons for the introduction of optical solutions in radio access and backhaul networks, where packet processing is moved to the access and metro edge of the network and intermediate channel add-drop and ring interconnection is performed at the physical layer in the optical domain.

In order to minimize any asymmetry between the upstream (US) and downstream (DS) directions (a key requirement in RAN), bidirectional propagation is considered over a single fibre. Cost saving is another reason for using bidirectional schemes, since no duplicated equipment is necessary for the two directions. In contrast, conventional ROADMs that deal with two fibres unidirectional links cannot manage the link protection in the bidirectional case. Such conventional ROADMs can add selected wavelengths in either direction of a WDM dual fiber ring.

US/DS symmetry can be provided which can be crucial for CPRI links for example. Resiliency can be obtained with low latency compared to electrical switches, and at lower cost, suitable for RAN and Mobile Backhaul applications for example. In some embodiments a simple solution can offer the possibility to interconnect rings in a RAN in a cost efficient and transparent way.

The invention claimed is:

1. A method of using an optical communications network having an interconnecting node coupled in between at least one hub node and at least first and second access nodes, to provide a first working optical path and a first protection optical path between the interconnecting node and the first access node, and to provide a second working optical path and a second protection optical path between the interconnecting node and the second access node, and to provide a hub working optical path and a hub protection optical path between the hub and the interconnecting node, and having a working wavelength selective switch to select which wavelengths are coupled optically between the hub working optical path and either of the first and second working optical paths, and a protection wavelength selective switch to select which wavelengths are coupled optically between the hub protection optical path and either of the first and second protection optical paths, the method having the steps of:

sending traffic between the first access node and the hub node on a selected wavelength set up through the working wavelength selective switch, and the first working optical path and the hub optical working path, and in the event of detection of a fault, the method comprising protection switching of the traffic at the first access node and the hub node to send that traffic on a selected wavelength set up through the protection wavelength selective switch, and the first protection optical path, and the hub protection optical path, wherein the protection switching is carried out without altering the selections made by the wavelength selective switches in the interconnecting node.

2. The method of claim 1, having the preliminary step of causing wavelengths to be set up for sending and protecting traffic between the first access node and the hub node by remotely configuring the working wavelength selective switch, and by remotely configuring the protection wavelength selective switch.

3. The method of claim 1, having the step of using the interconnecting node for selectively coupling wavelengths between the first working optical path and the first protection optical path, so as to operate the first working optical path and the first protection optical path as an access bidirectional optical ring, and the step of switching the traffic in the event of a fault comprises sending the traffic in the other direction around the access bidirectional optical ring.

4. The method of claim 1, the interconnecting node also having a hub ring path between the working wavelength selective switch and the protection wavelength selective switch, and the method comprises operating the hub ring path and the hub working optical path and the hub protection optical path as a hub bidirectional optical ring, and the step of switching the traffic in the event of the fault detection comprises sending the traffic in the other direction around the hub bidirectional optical ring.

5. The method of claim 1 having the step of monitoring to detect the fault, the monitoring being made away from the interconnecting node.

6. The method of claim 1, the sending step comprising sending traffic in both directions over the working optical paths, and in the event of the fault detection, sending the traffic in both directions over the protection optical paths.

7. The method of claim 1, having the step of using the interconnecting node also as an add drop node to couple local traffic with the optical communications network.

8. An optical communications network having an interconnecting node coupled in between at least one hub node and at least first and second access nodes, to provide a first working optical path and a first protection optical path between the interconnecting node and the first access node, and to provide a second working optical path and a second protection optical path between the interconnecting node and the second access node, and to provide a hub working optical path and a hub protection optical path between the hub and the interconnecting node,
 the interconnecting node having a working wavelength selective switch configurable to set up wavelengths for sending traffic between the first access node and the hub node by selecting which wavelengths are coupled optically between the hub working optical path and either of the first and second working optical paths, and
 the interconnecting node having a protection wavelength selective switch configurable to set up wavelengths for sending traffic between the first access node and the hub node by selecting which wavelengths are coupled optically between the hub protection optical path and either of the first and second protection optical paths
 the first access node and the hub node each having a switch to send the traffic on the selected wavelength set up through the working wavelength selective switch, and the first working optical path and the hub optical working path, and in the event of a fault detection, to carry out protection switching, to send that traffic on the selected wavelength set up through the protection wavelength selective switch, and the first protection optical path, and the hub protection optical path, wherein the interconnecting node is configured not to alter the selections made by the wavelength selective switches in response to the fault detection.

9. The network of claim 8, the interconnecting node having an interface for receiving configuration commands to remotely configure the working wavelength selective switch and the protection wavelength selective switch to set up wavelengths for sending and protecting traffic between the first access node and the hub node.

10. The network of claim 8, the interconnecting node also having a first access wavelength selective switch system for selectively coupling wavelengths between the first working optical path and the first protection optical path, such that the first working optical path and the first protection optical path are operable as an access bidirectional optical ring, and the switch of the first access node is configured to switch a direction of the traffic in the event of a fault in the other direction around the access bidirectional optical ring.

11. The network of claim 8, the interconnecting node also having a hub ring path between the working wavelength selective switch and the protection wavelength selective switch, such that the hub ring path and the hub working optical path and the hub protection optical path are operable as a hub bidirectional optical ring, and such that in the event of a fault, the hub node and the interconnecting node are arranged such that the traffic is passed in the other direction around the hub bidirectional optical ring.

12. The network of claim 11, and having a second interconnecting node coupled in the hub bidirectional optical ring.

13. An interconnecting node for use in the optical communications network of claim 8, the interconnecting node having a working wavelength selective switch configurable to set up wavelengths for sending traffic between the first access node and the hub node by selecting which wavelengths are coupled optically between the hub working optical path and either of the first and second working optical paths, and
 the interconnecting node also having a protection wavelength selective switch configurable to set up wavelengths for sending traffic between the first access node and the hub node by selecting which wavelengths are coupled optically between the hub protection optical path and either of the first and second protection optical paths, for use in the event of protection switching triggered by detection of a fault,
 wherein the interconnecting node is configured not to alter the selections made by the wavelength selective switches in response to the fault detection.

14. The interconnecting node of claim 13, the interconnecting node also having a first access wavelength selective switch system for selectively coupling wavelengths between the first working optical path and the first protection optical path, such that the first working optical path and the first protection optical path are operable as an access bidirectional optical ring, and the switch of the first access node is configured to switch a direction of the traffic in the event of a fault in the other direction around the access bidirectional optical ring.

15. The interconnecting node of claim 14, the access wavelength selective switch system comprising a working access wavelength selective switch and a protection access wavelength selective switch, and an access ring path between them, such that these wavelength selective switches are configurable to select which of the wavelengths are passed around the access bidirectional optical ring, and which are passed between the hub node and the access nodes.

16. The interconnecting node of claim 13 also having a hub optical path between the working wavelength selective switch and the protection wavelength selective switch, such that the hub working optical path and the hub protection optical path are operable as a hub bidirectional optical ring, and such that in the event of a fault, the hub node and the interconnecting node are arranged such that the traffic is passed in the other direction around the hub bidirectional optical ring.

17. The interconnecting node of claim 13 and being configured to pass the traffic without monitoring to detect the fault.

18. The interconnecting node of claim 13 and having an add drop port to couple local traffic with the optical communications network.

19. The interconnecting node of claim 18, and having a packet aggregation part coupled to the add drop port configured to carry out packet aggregation on part of the traffic dropped at the add drop part, and configured to pass the part of the traffic after packet aggregation to the add drop port to be added back into its path in the optical communications network.

* * * * *